United States Patent [19]

Baillie et al.

[11] Patent Number: 5,092,277

[45] Date of Patent: Mar. 3, 1992

[54] CAT LITTER CONTAINMENT SYSTEM

[76] Inventors: Robert A. Baillie; Suzanne M. Baillie, both of 1506 Washington Ave., Wall, N.J. 07719

[21] Appl. No.: 718,371

[22] Filed: Jun. 20, 1991

[51] Int. Cl.⁵ ............................................. A01K 29/00
[52] U.S. Cl. ...................................... 119/165; 119/15
[58] Field of Search .......................... 119/165, 19, 29; 272/113

[56] References Cited

U.S. PATENT DOCUMENTS

| | | | |
|---|---|---|---|
| 2,883,192 | 4/1959 | Royston | 272/113 |
| 3,035,544 | 5/1962 | Katt, Jr. | 119/19 |
| 3,618,568 | 3/1970 | Breeden | 119/165 |
| 4,347,807 | 9/1982 | Reich | 119/19 |

Primary Examiner—Gene Mancene
Assistant Examiner—Thomas Price
Attorney, Agent, or Firm—Charles I. Brodsky

[57] ABSTRACT

The apparatus of the invention includes an enclosed housing having a cat litter box within its bottom confines. An opening is provided in the top surface of the housing, through which the cat climbs, onto a lower, intermediate surface level. A partition is there provided, around which the cat is forced to walk, in order to gain entry to the litter box by climbing down through a second opening. The lower, intermediate surface level is of an open-grid construction, so that when the cat reverses its path to leave the litter box, any litter trapped on its paws falls, by gravity, back into the box as the cat walks around the partition, to climb out of the housing through the first opening.

9 Claims, 4 Drawing Sheets

CAT LITTER CONTAINMENT SYSTEM

FIELD OF THE INVENTION

This invention relates to cat litter boxes and, more particularly, to an apparatus for containing the litter within the box employed.

BACKGROUND OF THE INVENTION

As is well known and understood individual cats have different idiosyncrasies in their use of litter boxes. Some cats, for example, spend upwards of 10 minutes, and more, in the use of the litter system, while others are over and done with in less than a minute. Some cats, additionally, thrash around while using the litter box, while others just docilely use it, and then leave. As any cat owner will attest, the longer the cat stays in the litter box, using it, and the more it thrashes about, the greater is the propensity for the litter to be propelled outwardly from the box, to land around, and all over, the floor. As a result, it is not unusual to have to vacuum, or otherwise clean up, after the cat uses the box, as often as several times each day.

Were this not bad enough, almost every cat owner could further attest that the pieces which comprise the litter as employed today almost always sticks to the paws and fur of the cat as it leaves the box, and is dragged by the cat all over the house or apartment as it moves about, until ultimately dislodged. Thus, it is not only an added chore to clean up in the immediate area of the litter box, but to have to follow the cat and clean up wherever it goes.

And, as cat fanciers can further testify, these problems multiply with the number of cats that are owned. Simply stated, although the problem is bad enough when one cat is owned, the problems become that much more magnified as there are more-and-more cats around.

OBJECTS OF THE INVENTION

It is therefore an object of the invention to provide a containment system for the type of cat litter commonly employed.

It is another object of the invention to provide such a system which will contain the litter not only if the cat using the litter box thrashes about, but, also, after it has finished, and desires to leave the litter box for other places in the home or apartment.

It is a further object of the invention to provide such a system, as well as an apparatus which comprises it, as will be an enticement for use by the cat, and one which would not frighten the cat away from its use.

It is another object of the invention to provide such a system and apparatus which is relatively inexpensive to manufacture and convenient to transport and install.

SUMMARY OF THE INVENTION

As will become clear hereinafter, the containment system and apparatus of the present invention includes an enclosed housing having a cat litter box within its bottom confines. An opening is provided in the top surface of the housing, through which the cat climbs, onto a lower, intermediate surface level. A partition is there provided, around which the cat is forced to walk in order to gain entry to the litter box, and by climbing down through a second opening. The lower, intermediate surface will be seen to be of an open-grid construction, so that when the cat reverses its path to leave the litter box, any litter trapped on its paws or fur falls by gravity, back into the box as the cat walks around the partition, to climb out of the housing through the first opening.

In a preferred embodiment of the invention, as will be seen, the containment system comprises two identical sections which fit together, which can be shipped along with a pair of doors, a pair of grids (for forming the intermediate level for the enclosure and a similarly configured top level), and the partition (or divider). In this version, to be described below, one of the doors will be constructed of a wood, or plastic composition, non-see-through, to be used in the bottom section once installed, and behind which the cat litter box is housed. The other door, on the other hand, will be seen to be of a plastic see-through composition, to be installed in the top section of the enclosure, to enable one to note the condition in the top section as being clean, or sufficiently dirty to warrant cleaning.

As will further be seen, the two grids employed in the preferred embodiment—although the advantages of the invention will be available if only the intermediate level grid is employed—are of sufficient aperture to allow the litter collected to fall back into the litter box, or into the lower compartment where the litter box is housed.

In actual use, the partition, or divider, employed has been noted to establish a maze in the housing, which presented a sufficient curiosity to the cat upon first entering the enclosure, to walk around it until spotting the second opening providing the access to the litter box below. Further use revealed almost no hesitancy on the part of the cat to enter the enclosure, or to thereafter use it on a regular basis as the need arose.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE DRAWINGS

Figure 1:
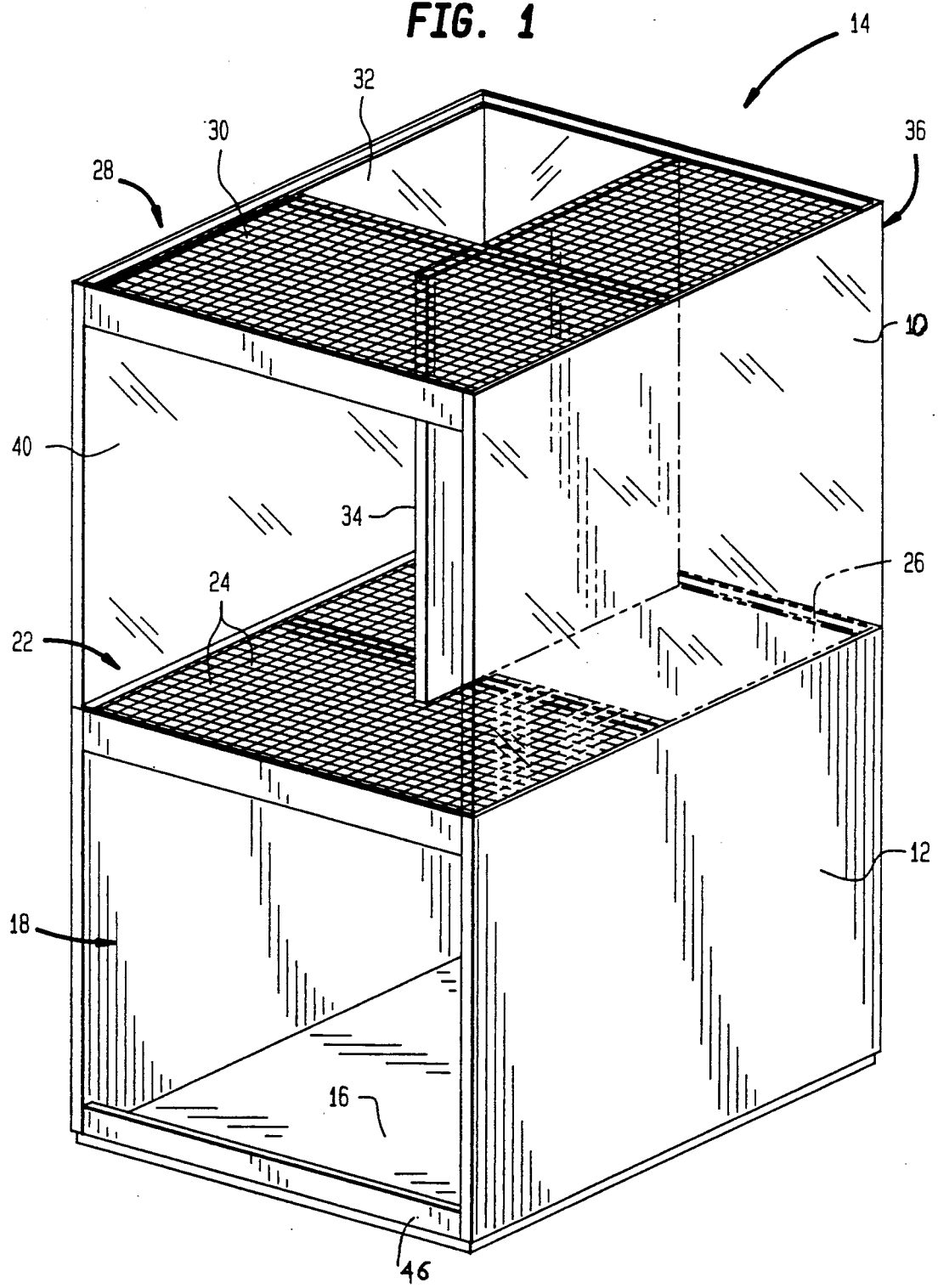
FIG. 1 is a front perspective view of a cat litter containment system constructed in accordance with the invention.
Figure 2:
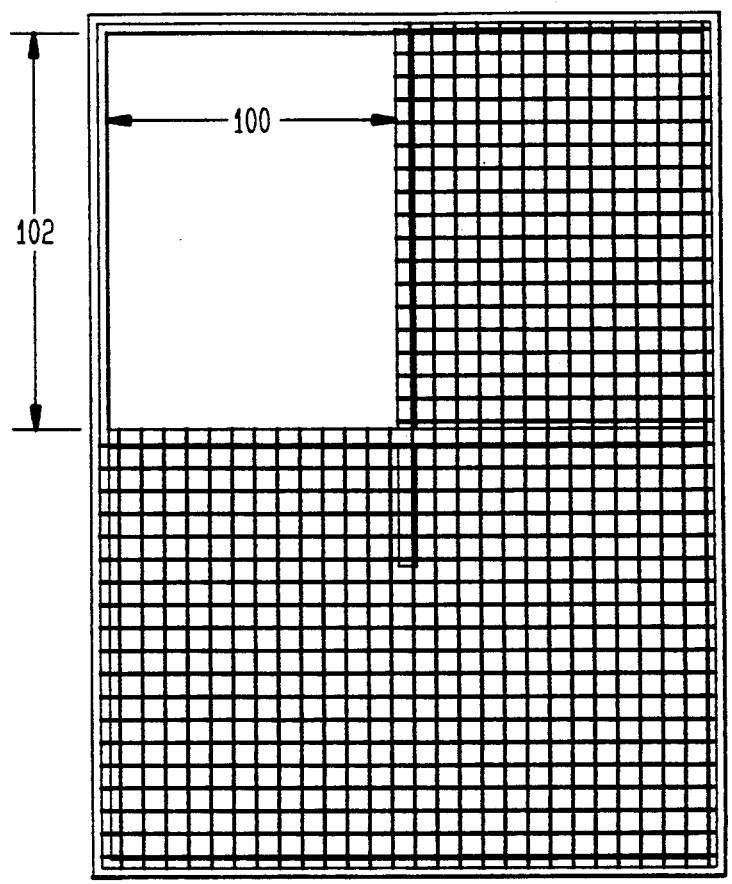
FIG. 2 is a top view of the housing comprising the apparatus of the invention.

Referring to FIGS. 1 and 2, the cat litter containment system apparatus employs a pair of identically dimensioned sections 10, 12 fitted one atop the other to form a complete enclosure 14. The bottom section 12 is provided with a bottom surface 16 on which the cat litter box is intended to rest, and to which access for cleaning may be had by means of an openable door positioned at the location designated by the reference numeral 18. In a preferred embodiment of the invention, the walls which comprise the section 12 are fabricated of a non-see-through composition, and the door to be installed at the location 18 is of a similar, non-see-through fabrication. As will be appreciated, grooves may be provided in the vicinity of the front of the enclosure so that the door to be installed at location 18 can be simply slid into position. Any suitable construction for this is acceptable.

A further series of grooves, or appropriate construction, is provided at the top of the section 12 to support the side walls of the upper section 10, fabricated in accordance with a preferred embodiment of the invention, of a see-through plastic composition. Likewise, the upper surface of the section 12 is configured to accept an intermediate surface 22 which is apertured, as at 24 in an open-grid configuration. As will be appreciated, and in accordance with the invention, any desired aperture arrangement may be employed, but an open-grid configuration has proven to be preferable, as long as the apertures are of sufficient size as to pass any captured litter particles, and of a manufacture so as not to injure the paws of a cat that might be walking on the surface. As will be seen, the intermediate surface 22 is of this open-grid configuration, continuous across the surface, except in the area designated as 26, where an opening is provided of sufficient size to permit a cat to climb through. Thus, in one construction of the invention, employing sections 10 and 12 of an approximate 18"×24" outer dimension, and some 16" high for each section 10, 12, the opening 26 was provided with dimensions 100, 102 some 8" and 10¾", respectively.

As will also be seen in FIGS. 1 and 2, a top surface 28 is provided, according to the preferred embodiment, identical in construction and appearance with the intermediate surface 22. Likewise having an open grid construction 30 of spacing to accept passing of any trapped litter particles, the surface 28 includes that same cat-sized opening 32 through which the cat can climb into the enclosure, when desiring to use the litter box, and to climb out from the enclosure once it is finished. As with the intermediate surface 22, the top surface 28 is configured and designed to cooperate with grooves or other appropriate fabrications in the top edges of the section 10 so as to rest upon it when in place.

(Those skilled in the art will appreciate that the optimum operation of the containment system follows from the use of the open-grid configuration for the surface 28, but also will recognize that the advantages of the invention also are had in constructions where the top surface 28 is not apertured at all, or with a different aperture configuration than that for the surface 22, as long as the cat-sized opening 32 is available.)

Lastly shown in FIGS. 1 and 2 is a partition, or divider, 34, vertically extending from the surface 22 towards the surface 28, and outwardly from a rear wall of the section 10, as at 36. When extending substantially from the surface 22 to meet with, or only approach, the underside of the surface 28, and to extend some 50%–60% forwardly of the enclosure towards a front wall, as at 40, the partition 34 essentially forms a "maze" atop the surface 22, and around which a cat must walk either in entering the enclosure so formed to reach the litter box at the bottom, or in reversing its path after it has finished so as to exit the housing. Again, as with the sections 10, 12, various grooves or other arrangements may be provided in the individual segments which make up the housing so as to accept the partition 34, and to retain it vertically in use.

In such arrangement, it becomes a simplified matter to construct the sections 10 and 12 identically as separate pieces, and to transport them along with the surfaces 16, 22, 28 and the partition 34 so that upon unpacking, they can be installed together—once the door at location 18 and wall 40 arc included as well.

Referring then to FIGS. 1 and 2, and with the understanding that the cat litter box has been inserted onto the surface 16, the cat desiring to use the litter box merely climbs through the opening 32, walks around the partition 34 and then climbs through the opening 26 to reach the bottom confines of the enclosure. In similar manner, to leave the enclosure, the cat then climbs out through the opening 26, walks along the surface 22 around the partition 34, and then climbs back out through the opening 32, to either leave the containment system directly, or to walk along or even sit upon, the surface 28.

In this matter, and as will be apparent, the enclosure of the system prevents any litter from being impelled outside the apparatus by the cat thrashing about in it while in use, and that any litter particles which adhere to its paws or fur will fall through the grid openings 24, 30 as the cat is forced to walk about the partition in leaving the housing. With the grid openings 24, 30 of sufficient size to pass these litter particles, the particles will then be seen to fall by gravity back downwardly towards the litter box in the lower compartment, to either fall back into the litter box, or in the area surrounding it where the particles can be easily gathered, instead of being trudged around the house or apartment where the cat walks, as typified prior arrangements.

Figure 3:
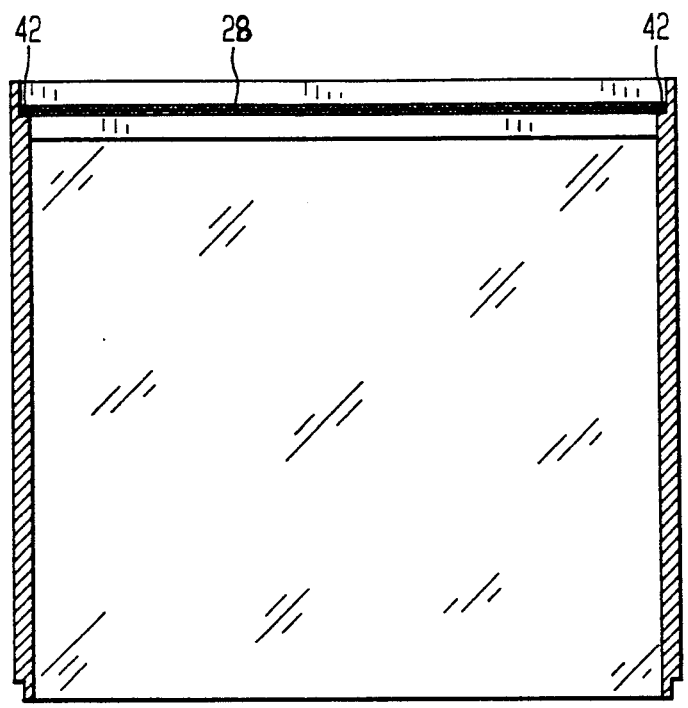
FIGS. 3-8 are parts views illustrating several of the components which are fitted together in installing the cat litter containment system ready for use.
Figure 4:
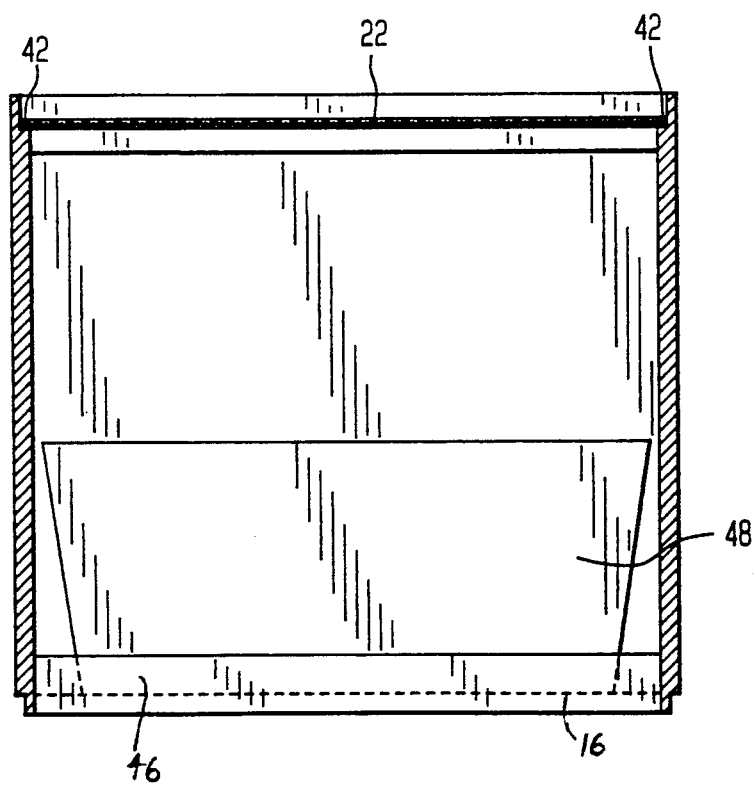

FIGS. 3 and 4 illustrate, in partially sectional view, the front portions of the sections 10, 12, respectively, and are identical, as mirror images, to their respective rear sections. As illustrated, a shelf is provided, at 42, to support the top surface 28 (FIG. 3) and intermediate surface 22 (FIG. 4), each of which may be of a ⅜" thickness.

Figure 5:
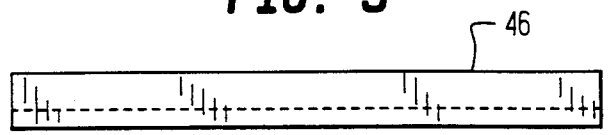
Figure 6:
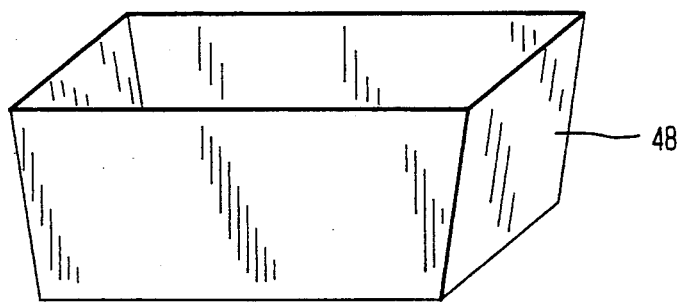

FIG. 5 illustrates a base 46 for inclusion at the bottom section 12 in supporting the bottom surface 16 while FIG. 6 illustratively shows a plastic litter box to be there used. So as to capture as much of the litter particles that fall through the apertures 24, 30 of the surfaces 22, 28, respectively, the litter box of FIG. 6—shown by the reference numeral 48—is of a length only slightly less than the 24" dimension of the enclosed housing 14, and of a width only slightly less than the 18" width of the housing. A depth or some 6", or so, was found to afford ample room for the cat to climb inside the litter box, with sufficient clearing to the surface 22 so that the cat would not be hampered in its use of the litter system.

Figure 7:
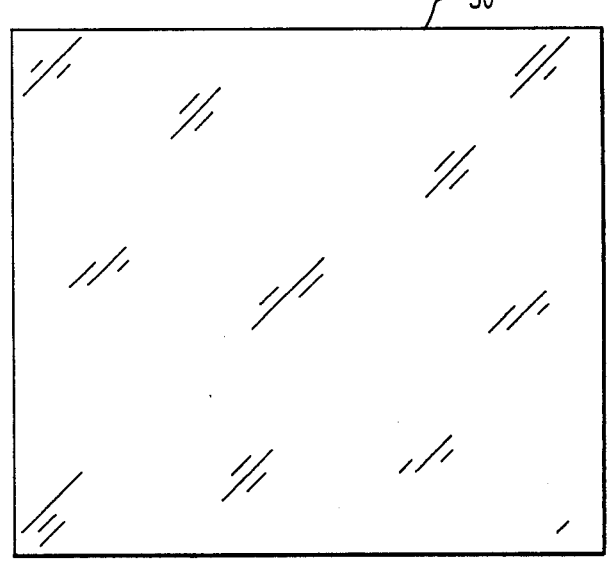
Figure 8:
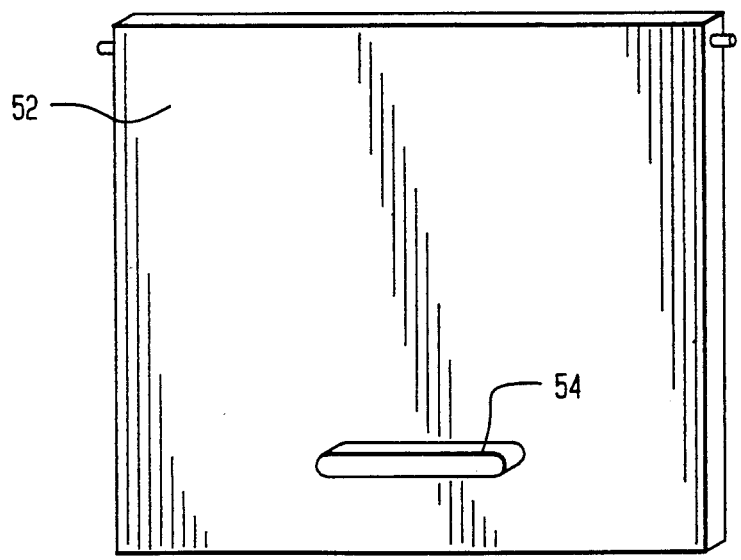

FIGS. 7 and 8 illustrate a pair of doors which comprise the front doors of the enclosed housing 14 when in position, and which permit entry into the housing when desired. In particular, the door 50 of FIG. 7 is of the previously referred to see-through composition which can be slid into position in the top section 10, and which can be slid out of position, i.e. upwardly, to gain access to clean off the apertures of the intermediate surface 22. The door 52, on the other hand, is of the non-see-through composition which, when in place in the bottom section 12 of the housing 14 can be opened and closed by means of a handle 54 to gain access to the litter box 48 when it is time to change the litter.

Figure 9:
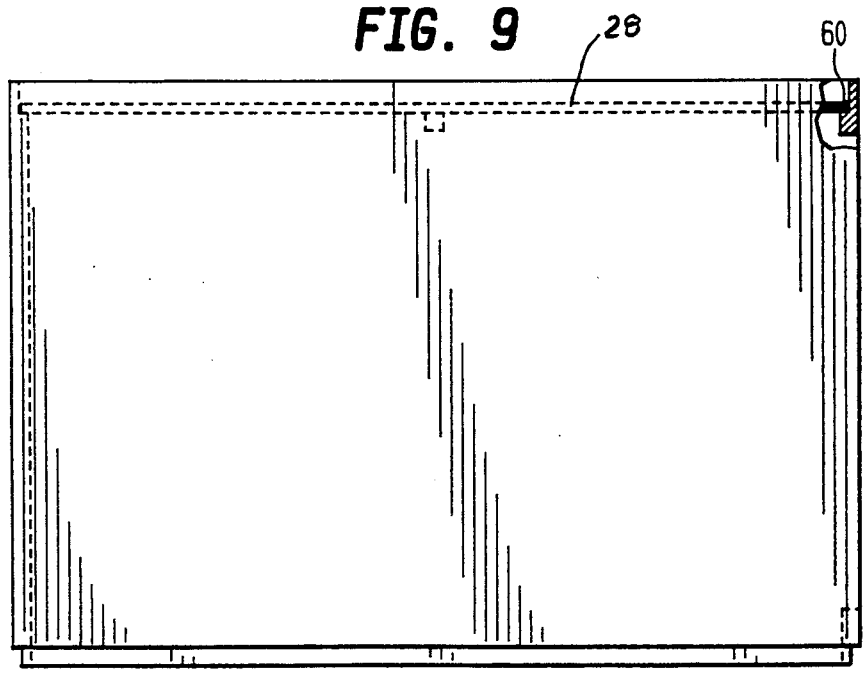
FIGS. 9 and 10 are helpful in an understanding of the manner of putting the system of the invention together so that it may be utilized in operation.
Figure 10:
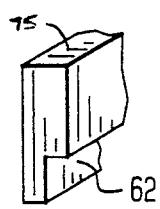

FIGS. 9 and 10 are views additionally helpful in an understanding as to how the surfaces 22, 28 rest in position—the representation of FIG. 9 being that of a side view showing a shelf 60 supporting the surface 28, with the partition 34 being removed. FIG. 10 shows an additional shelf 62 upon which the base 46 rests at 75 in putting the enclosure together.

While there have been described what are considered to be preferred embodiments of the present invention, it will be readily appreciated by those skilled in the art that modifications can be made without departing from the scope of the teachings herein. Thus, and for example, the enclosure of the invention could additionally be provided with magnetic catches for the door 52 so as to retain it in position and not being pulled open by toddlers in the home or apartment, who might otherwise be able to gain access to the plastic litter box 48 stored in the lower section 12. Additionally, or in the alternative, any composition can be used for the materials which comprise the enclosure—which will continue to operate the same way whether the housing formed be of a see-through composition, or of a non-see-through composition. In either event, as will be clear, the cat, in order to use the litter box has to climb through the top opening 32, walk on the surface 22 around the partition 34 to get through the opening 26; and the reverse path must be taken to leave the box, and to in such manner, capture the litter particles that otherwise adhere to a cat's paws or fur when using the box. That recapture of the adhering litter particles—together with the enclosed housing itself—has been noted to very significantly decrease the amount of litter previously noted to exit the box when used by cats according to prior arrangements. For at least such reasons, therefore, resort should be had to the claims appended hereto for a true understanding of the scope of the invention.

We claim:

1. Apparatus comprising:
   a housing having a top surface, a bottom surface, an intermediate surface, and a plurality of side walls enclosing said housing;
   a partition extending from said intermediate surface towards said top surface, said partition being of a length less than the distance between opposing side walls of said housing;
   a first opening in said top surface, extending towards said intermediate surface on a first side of said partition;
   a second opening in said intermediate surface, extending towards said bottom surface on an opposite side of said partition;
   and with said intermediate surface being in the nature of an open-grid construction.

2. The apparatus of claim 1 wherein said top surface is in the nature of an open-grid construction.

3. The apparatus of claim 1 wherein said housing includes at least one side wall between said top surface and said intermediate surface of see-through composition.

4. The apparatus of claim 1 wherein said housing includes at least one side wall between said bottom surface and said intermediate surface of non-see-through composition.

5. The apparatus of claim 1 wherein said housing is of orthogonal configuration having front, rear, left and right side walls, and wherein said front side wall is composed of two separate panels, a first between said top surface and said intermediate surface, and a second between said intermediate surface and said bottom surface.

6. The apparatus of claim 5 wherein said first panel is of a see-through composition, and said second panel is of a non-see-through composition.

7. The apparatus of claim 1, also including a cat litter box on said bottom surface.

8. The apparatus of claim 7 wherein said first and second openings are dimensioned to allow passage of a cat from said top surface to said intermediate surface, and from said intermediate surface to said bottom surface.

9. The apparatus of claim 8 wherein said partition extends vertically from said intermediate surface to said top surface, and wherein said partition extends horizontally from one side wall approximately 50%–60% the way towards said opposing side wall.

* * * * *